United States Patent
Jensen

(10) Patent No.: US 7,980,073 B2
(45) Date of Patent: Jul. 19, 2011

(54) HYBRID SYSTEM FOR A POWERTRAIN AND HYDRAULIC SYSTEM

(75) Inventor: Jeffrey Edward Jensen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 572 days.

(21) Appl. No.: 12/149,806

(22) Filed: May 8, 2008

(65) Prior Publication Data

US 2009/0277168 A1    Nov. 12, 2009

(51) Int. Cl.
*E02F 9/20* (2006.01)
(52) U.S. Cl. ............................................. 60/414; 60/484
(58) Field of Classification Search .................... 60/414, 60/436, 484; 37/466
See application file for complete search history.

(56) References Cited

U.S. PATENT DOCUMENTS

| | | | |
|---|---|---|---|
| 3,512,072 A | 5/1970 | Karazija et al. | |
| 3,885,204 A | 5/1975 | Abels et al. | |
| 3,947,744 A | 3/1976 | Grace et al. | |
| 4,723,107 A | 2/1988 | Schmid | |
| 4,761,954 A | 8/1988 | Rosman | |
| 5,649,422 A | 7/1997 | Baginski et al. | |
| 6,005,360 A | 12/1999 | Pace | |
| 6,349,543 B1 | 2/2002 | Lisniansky | |
| 6,460,332 B1 | 10/2002 | Maruta et al. | |
| 6,527,348 B2 | 3/2003 | Jensen | |
| 6,708,787 B2 * | 3/2004 | Naruse et al. | 180/53.8 |
| 6,725,581 B2 | 4/2004 | Naruse et al. | |
| 6,848,253 B2 | 2/2005 | Johansson et al. | |
| 6,945,039 B2 | 9/2005 | Yoshino | |
| 6,962,050 B2 | 11/2005 | Hiraki et al. | |
| 7,086,226 B2 * | 8/2006 | Oguri | 60/414 |
| 7,181,910 B2 | 2/2007 | Nissen et al. | |
| 7,634,911 B2 | 12/2009 | Brinkman | |
| 7,669,413 B2 * | 3/2010 | Komiyama et al. | 60/414 |

FOREIGN PATENT DOCUMENTS

JP    2005012900 A  *  1/2005
JP    2007217992 A  *  8/2007

* cited by examiner

*Primary Examiner* — Thomas E Lazo
(74) *Attorney, Agent, or Firm* — Finnegan, Henderson, Farabow, Garrett & Dunner LLP

(57) ABSTRACT

A hybrid system for a machine is disclosed. The system has a pump configured to generate fluid flow within a hydraulic system and a first actuator actuated by fluid pressurized by the pump. The system also has a first motor configured to be selectively actuated by pressurized fluid directed from the first actuator by an external load and directed to the first motor by a first control valve. The system further has a first generator configured to be actuated by the first motor and a power source configured to actuate the pump. The system also has a powertrain including a first driveshaft and at least one traction device, the powertrain configured to transfer kinetic energy from the traction device to the first driveshaft during deceleration of the machine. The system further has a second generator configured to be selectively actuated by the kinetic energy transferred by the powertrain.

20 Claims, 2 Drawing Sheets

HYBRID SYSTEM FOR A POWERTRAIN AND HYDRAULIC SYSTEM

TECHNICAL FIELD

The present disclosure is directed to a hybrid system and, more particularly, to a hybrid system for a powertrain and a hydraulic system.

BACKGROUND

Machines such as, for example, dozers, loaders, excavators, motor graders, and other types of heavy machinery use one or more hydraulic cylinders to accomplish a variety of tasks. These cylinders are fluidly connected to a pump on the machine that provides pressurized fluid to chambers within the cylinders. As the pressurized fluid moves into or through the chambers, the pressure of the fluid acts on hydraulic surfaces of the chambers to effect movement of the cylinder and a connected tool. When the pressurized fluid is drained from the chambers it is returned to a low pressure sump on the machine. The fluid draining from the cylinder chambers to the sump has a pressure greater than the pressure of the fluid already within the sump. As a result, the higher pressure fluid draining into the sump contains potential energy that is wasted when directed to the low pressure sump, reducing efficiency of the hydraulic system.

An analogous reduction in efficiency may also occur in relation to a powertrain of a machine, used to actuate traction devices to propel a machine. Energy may be dissipated as heat and wasted when conventional brakes are applied to the powertrain to cause the machine to decelerate. Instead of using conventional brakes, a machine may be decelerated by transferring the kinetic energy via a powertrain to a motor via one or more electric motors.

One attempt at increasing the efficiency of a machine using hydraulic cylinders is described in U.S. Pat. No. 6,962,050 (the '050 patent) issued to Hiraki et al. The '050 patent discloses a hybrid machine including hydraulic cylinders for performing repetitive work against external loads. Hydraulic pumps are configured to supply hydraulic fluid to chambers of the hydraulic cylinders to extend the cylinders and perform work against external loads. The '050 patent discloses that the hydraulic cylinders may also contract under the force of external loads, e.g., when a truck bed lowers under the force of gravity, where the external loading may direct the hydraulic fluid in a reverse direction through the hydraulic pumps. The hydraulic fluid pressurized by the external loads may be used to drive electric motors connected to the pumps and generate electrical power.

Although the system of the '050 patent may provide a method for using hydraulic energy to generate electrical power, it fails to utilize other methods for generating electrical power. The '050 patent fails to simultaneously take advantage of using the mechanical energy of a powertrain and the hydraulic energy of a hydraulic system to maximize energy regeneration in a machine.

The present disclosure is directed to overcoming one or more of the shortcomings set forth above.

SUMMARY OF THE DISCLOSURE

In accordance with one aspect, the present disclosure is directed toward a hybrid system for a machine. The system includes a pump configured to generate fluid flow within a hydraulic system and a first actuator actuated by fluid pressurized by the pump. The system also includes a first motor configured to be selectively actuated by pressurized fluid directed from the first actuator by an external load and directed to the first motor by a first control valve. The system further includes a first generator configured to be actuated by the first motor and a power source configured to actuate the pump. The system also includes a powertrain including a first driveshaft and at least one traction device. The powertrain is configured to transfer kinetic energy from the traction device to the first driveshaft during deceleration of the machine. The system additionally includes a second generator configured to be selectively actuated by the kinetic energy transferred by the powertrain.

According to another aspect, the present disclosure is directed toward a hydraulic system for a hybrid machine. The system includes a pump configured to generate fluid flow within a hydraulic system. The system also includes first and second control valves, each having a plurality of positions for directing fluid. The system additionally includes a first actuator configured to be actuated by fluid pumped by the pump and directed to the first actuator via the first and second control valves. The system also includes a first motor configured to be selectively actuated by pressurized fluid directed from the first actuator by an external load and directed to the first motor via the second control valve. The system additionally includes a first generator actuated by the first motor.

DETAILED DESCRIPTION

Figure 1:
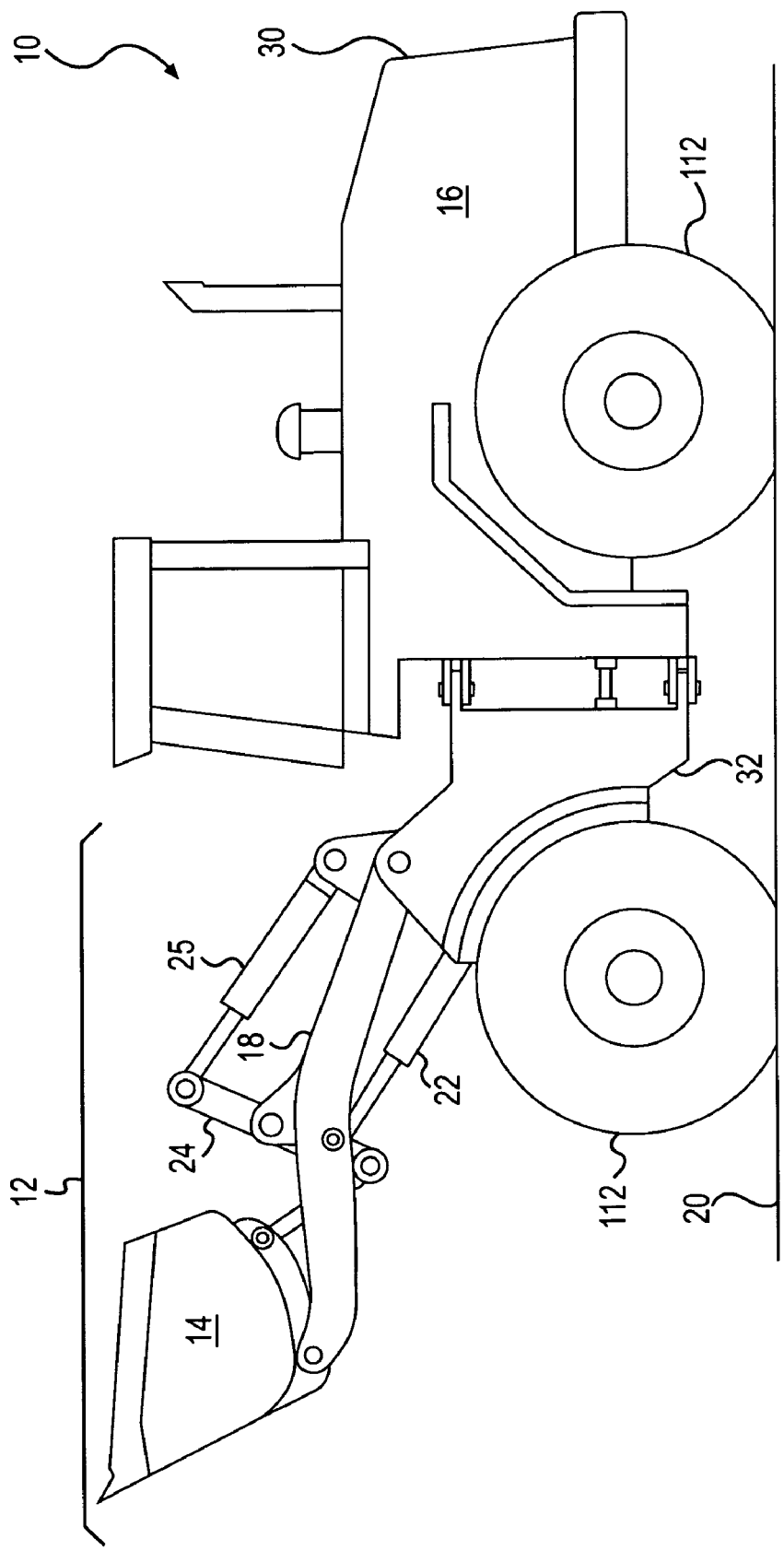
FIG. 1 is a pictorial illustration of an exemplary disclosed machine.

FIG. 1 illustrates an exemplary machine 10 having multiple systems and components that cooperate to accomplish a task. Machine 10 may embody a mobile machine that performs some type of operation associated with an industry such as mining, construction, farming, transportation, or any other industry known in the art. For example, machine 10 may be a machine such as the wheel loader depicted in FIG. 1. Alternatively, machine 10 may be a dozer, a backhoe, a motor grader, a haul truck having an articulating bed, or any other earth moving or task performing machine. Machine 10 may include an implement system 12 configured to move a tool 14, and a power source 16 configured to drive implement system 12.

Implement system 12 may include a linkage structure manipulated by fluid actuators to position and operate tool 14. Specifically, implement system 12 may include a lift arm 18 that is configured to pivot relative to a work surface 20 by a pair of adjacent, double-acting, lift arm actuators 22 (only one shown in FIG. 1). Implement system 12 may also include a single, double-acting tilt actuator 25 configured to pivot tool 14 via a pivot member 24. Lift arm 18 may be pivotally connected to a frame member 30 of machine 10, which may be connected to an undercarriage 32. It is contemplated that a greater or lesser number of fluid actuators may be included within implement system 12 and/or connected in a manner other than described above, if desired.

Numerous different tools 14 may be attachable to a single machine 10 and controllable by an operator of machine 10. Tool 14 may include any device used to perform a particular task such as, for example, a bucket, a fork arrangement, a blade, a shovel, a ripper, an articulating dump bed, a propelling device, a cutting device, a grasping device, or any other task-performing device known in the art. Although connected in the embodiment of FIG. 1 to pivot and swing relative to machine 10, tool 14 may alternatively or additionally slide, rotate, lift, or move in any other manner known in the art in response to an operator input.

Power source 16 may embody an engine such as, for example, a diesel engine, a gasoline engine, a gaseous fuel-powered engine, or any other type of combustion engine known in the art. It is contemplated that power source 16 may alternatively embody a non-combustion source of power such as a fuel cell, an accumulator, or another source known in the art. Power source 16 may produce a mechanical or electrical power output that may then be converted to hydraulic power for moving actuators 22 and 25.

Figure 2:
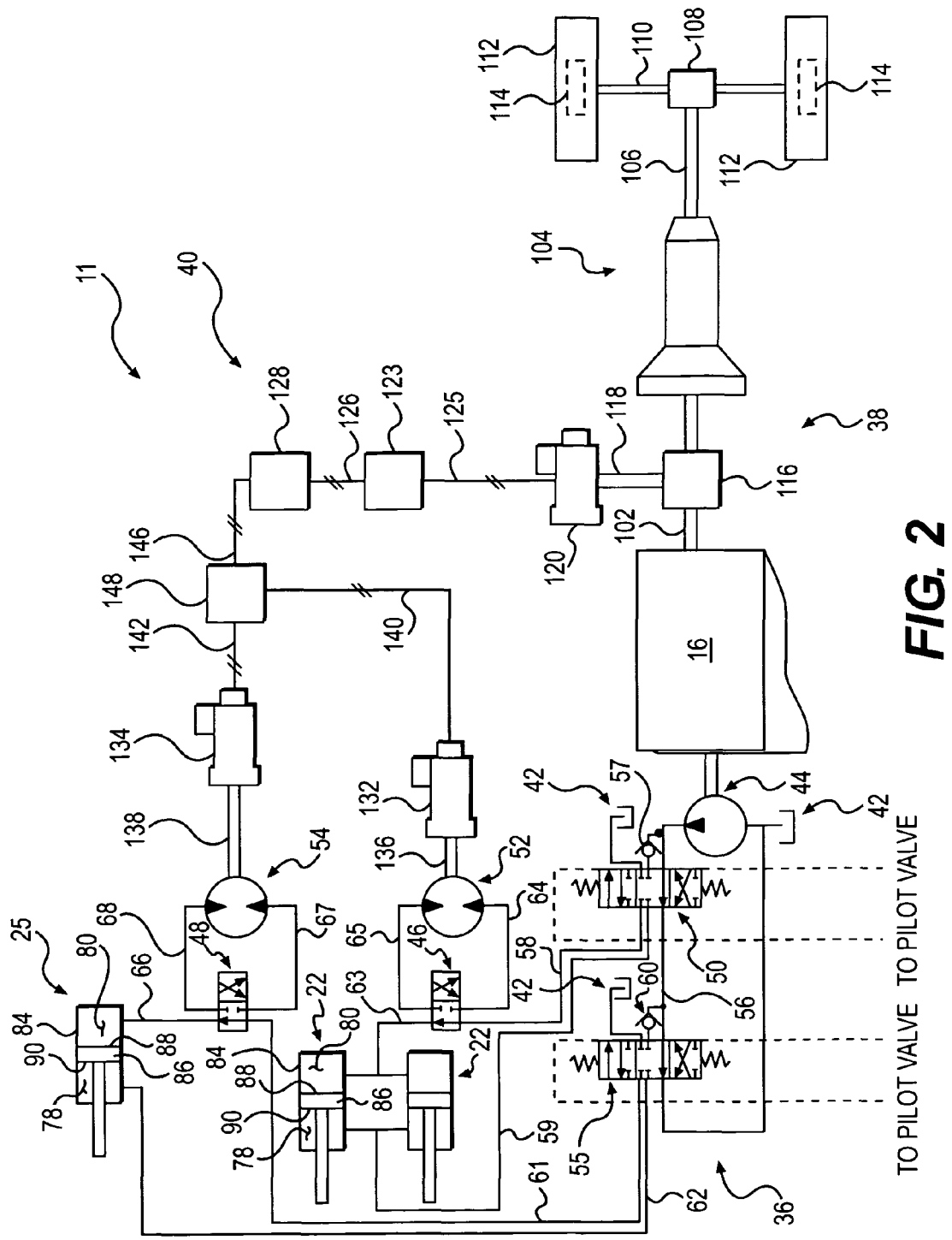
FIG. 2 is a schematic illustration of an exemplary hybrid system of the machine of FIG. 1.

Machine 10 may include a hybrid system 11, illustrated in FIG. 2. Hybrid system 11 may include a hydraulic system 36 having a plurality of fluid components that cooperate to move tool 14 (referring to FIG. 1). Hybrid system 11 may also include a powertrain 38 for propelling machine 10 across work surface 20. Hybrid system 11 may include an electrical unit 40 for converting mechanical and/or hydraulic energy into electrical energy that may be selectively used to supplement the power generated by power source 16. It is contemplated that electrical unit 40 may convert hydraulic power generated by hydraulic system 36 into electrical energy and may also convert mechanical power created by powertrain 38 into electrical energy. It is contemplated that electrical unit 40 may store the electrical energy and selectively use the stored electrical energy to contribute to the actuation of powertrain 38.

Referring to FIG. 2, hydraulic system 36 may include a tank 42 holding a supply of fluid, and a pump 44 configured to generate fluid flow to actuators 22 and 25. It is contemplated that hydraulic system 36 may include additional actuators of machine 10 described above, as well as any other type of hydraulic actuator known in the art. Hydraulic system 36 may include control valves 46, 48, 50, and 55, configured to control the direction of fluid flow between pump 44 and actuators 22 and 25. Hydraulic system 36 may also include motors 52 and 54. It is contemplated that hydraulic system 36 may include additional and/or different components such as, for example, motors, actuators, pressure relief valves, makeup valves, pressure-balancing passageways, temperature sensors, position sensors, acceleration sensors, and other components known in the art.

Tank 42 may constitute a reservoir configured to hold a supply of fluid. The fluid may include, for example, a dedicated hydraulic oil, an engine lubrication oil, a transmission lubrication oil, or any other fluid known in the art. One or more hydraulic systems within machine 10 may draw fluid from and return fluid to tank 42. It is also contemplated that hydraulic system 36 may be connected to multiple, separate reservoirs. Tank 42 may receive fluid from hydraulic system 36 via return passageways and/or via other return lines emanating from the components of hydraulic system 36. It is contemplated that tank 42 may store fluid at a low pressure.

Pump 44 may draw fluid from tank 42 and pressurize the fluid to a predetermined level. Pump 44 may embody a variable displacement pump configured to produce a variable flow of pressurized fluid. Pump 44 may be drivably connected to power source 16 by, for example, a countershaft, a belt, an electrical circuit, or in any other suitable manner, such that an output rotation of power source 16 results in a pumping action of pump 44. Alternatively, pump 44 may be connected indirectly to power source 16 via a torque converter, a gear box, or in any other manner known in the art. Pump 44 may discharge the pressurized fluid via a passageway 56 to control valves 50 and 55. It is contemplated that multiple sources of pressurized fluid may be interconnected to supply pressurized fluid to hydraulic system 36, if desired.

Actuators 22 may be connected to lift arm 18 and may work in unison to raise and lower lift arm 18 (referring to FIG. 1). Each actuator 22 may include a tube 84 and piston assembly 86 disposed within tube 84 to form first chamber 78 (i.e., a "rod end" of actuator 22) and second chamber 80 (i.e., a "head end" of actuator 22). Chambers 78 and 80 may be selectively supplied with pressurized fluid and drained of pressurized fluid to cause piston assembly 86 to displace within tubes 84, thereby changing the effective length of lift arm actuator 22. The flow rate of fluid into and out of chambers 78 and 80 may relate to a velocity of actuator 22, while a pressure differential between first chamber 78 and second chamber 80 may relate to a force imparted by actuator 22 to lift arm 18. Piston assembly 86 may include a first hydraulic surface 88 and a second hydraulic surface 90, disposed opposite of first hydraulic surface 88. An imbalance of force caused by fluid pressure on first and second hydraulic surfaces 88 and 90 may result in movement of piston assembly 86 within tube 84. Actuator 25 may be similar to actuators 22 and may pivot tool 14 via pivot member 24.

Control valve 50 may be a hydraulically actuated valve including biased springs, fluidly connected to pilot valves. The pilot valves may be operated by an operator, for example, via a control located in an operator station of a machine. The pilot valves may selectively cause a pressure to be applied against control valve 50 via a fluid passageway. When the pressure applied against control valve 50 is large enough to overcome the spring bias, control valve 50 may displace. Control valve 50 may alternatively be mechanically actuated, pneumatically actuated, solenoid operated, or actuated in any other suitable manner. Control valve 55 may be similar to control valve 50.

Control valve 50 may include, for example, three positions. In a first position, control valve 50 may fluidly connect pump 44 to control valve 55 via passageway 56. In a second position, control valve 50 may fluidly connect pump 44 to control valve 46 via a check valve 57 and a passageway 58. Check valve 57 may be a one-way valve such as, for example, a ball check valve, and may allow flow from pump 44 to control valve 50 while preventing flow from control valve 50 to pump 44. In the second position, control valve 50 may also fluidly connect first chambers 78 of actuators 22 to tank 42 via a passageway 59. In a third position, control valve 50 may fluidly connect control valve 46 to tank 42 via passageway 58. In the third position, control valve 50 may also fluidly connect pump 44 to first chambers 78 of actuators 22 via check valve 57 and passageway 59. It is contemplated that control valve 50 may cooperate with actuators 22 and control valve 46 to actuate motor 52 for generating power.

Control valve 55 may be similar to control valve 50. In a first position, control valve 55 may fluidly connect valve 50 to tank 42 via passageway 56. In a second position, control valve 55 may fluidly connect pump 44 to control valve 48 via a check valve 60, similar to check valve 57, and a passageway 61. Check valve 60 may allow flow from pump 44, via control valve 50, to control valve 55 while preventing flow in the opposite direction. In the second position, control valve 55 may also fluidly connect first chamber 78 of actuator 25 to tank 42 via a passageway 62. In a third position, control valve 55 may fluidly connect control valve 48 to tank 42 via passageway 61. In the third position, control valve 55 may also fluidly connect pump 44, via valve 50, to first chamber 78 of actuator 25 via check valve 60 and passageway 62. It is contemplated that control valve 55 may cooperate with actuator 25 and control valve 48 to actuate motor 54 for generating power.

Control valve 46 may be a proportional, solenoid-operated valve having a plurality of positions. Control valve 46 may alternatively be hydraulically actuated, mechanically actuated, pneumatically actuated, or actuated in any other suitable manner. In a first position, control valve 46 may fluidly connect second chambers 80 of actuators 22 to control valve 50 via passageways 58 and 63. In a second position, control valve 46 may fluidly connect second chambers 80 of actuators 22 to motor 52 via passageways 63 and 64. In the second position, control valve 46 may also fluidly connect motor 52 to tank 42 via control valve 50 and passageways 65 and 58. Loads such as, for example, external loads acting on tool 14 and/or gravity loads due to the weight of tool 14, may act on actuators 22 to force pressurized fluid out of actuators 22. It is contemplated that when control valve 46 is in the second position, loads may act on actuators 22 to force fluid out of second chambers 80 and through motor 52 to generate power instead of wasting the energy by directing the fluid directly into a low pressure tank.

Control valve 48 may be similar to control valve 46. In a first position, control valve 48 may fluidly connect second chamber 80 of actuator 25 to control valve 55 via passageways 61 and 66. In a second position, control valve 48 may fluidly connect second chamber 80 of actuator 25 to motor 54 via passageways 66 and 67. In the second position, control valve 48 may also fluidly connect motor 54 to tank 42 via control valve 55 and passageways 68 and 61. Loads such as, for example, external loads acting on tool 14 and/or gravity loads due to the weight of tool 14, may act on actuator 25 to force pressurized fluid out of actuator 25. It is contemplated that when control valve 48 is in the second position, loads may act on actuator 25 to force fluid out of second chamber 80 and through motor 54 to generate power instead of wasting the energy by directing the fluid directly into a low pressure tank. It is also contemplated that the hydraulic power generated when pressurized fluid actuates motors 52 and 54 may be converted into electrical energy by electrical unit 40, as described more fully below.

Powertrain 38, illustrated in FIG. 2, may include power source 16 configured to drive a first driveshaft 102. Powertrain 38 may also include a transmission 104 operably connecting first driveshaft 102 to a second driveshaft 106. Second driveshaft 106 may be operably connected to one or more outputs 108, where each output 108 may drive an axle 110. Powertrain 38 may also include traction devices 112 that may be actuated by axle 110 and traction devices 112 may be associated with brakes 114.

Transmission 104 may be a multi-speed bi-directional mechanical transmission having a neutral gear ratio, a plurality of forward gear ratios, a plurality of reverse gear ratios, and one or more clutches. The clutches may be selectively actuated to engage predetermined combinations of gears to produce a desired output gear ratio. Transmission 104 may be an automatic-type transmission, shifting based on a power source speed, a maximum selected gear ratio, and a shift map, or a manual-type transmission, shifting between each gear as initiated by an operator. It is contemplated that transmission 104 may transfer torque generated by power source 16 from first driveshaft 102 to second driveshaft 106.

During deceleration of machine 10 at, for example, relatively low speeds (e.g., in stop and go traffic), kinetic energy that may otherwise be lost as heat through conventional braking may be used to generate electrical power. For example, when machine 10 is travelling downhill, significant kinetic energy may be produced in powertrain 38. Instead of using conventional braking to decelerate machine 10, powertrain 38 may be used to mechanically transfer some of the kinetic energy to electrical unit 40, thereby helping to decelerate machine 10. Powertrain 38 may transfer kinetic energy from traction devices 112 to first driveshaft 102 via axle 110, second driveshaft 106, and transmission 104 as is known in the art. First driveshaft 102 may include a transfer gear 116, configured to transfer mechanical energy from first driveshaft 102 to electrical unit 40. It is contemplated that powertrain 38 may transfer kinetic energy resulting from the deceleration of machine 10 to electrical unit 40 to be converted into electrical energy.

Electrical unit 40 may be operably connected to powertrain 38. Electrical unit 40 may include a motor-generator 120 mechanically connected to transfer gear 116 of powertrain 38 by a shaft 118. Motor-generator 120 may be electrically connected to an electrical storage unit 128 via an inverter/converter 123 and lines 125 and 126.

Electrical unit 40 may also be operably connected to hydraulic system 36. Electrical unit 40 may include generators 132 and 134 that may be mechanically connected to motors 52 and 54 of hydraulic system 36 via shafts 136 and 138, respectively. Generators 132 and 134 may be electrically connected to an inverter/converter 148 via electrical lines 140 and 142, respectively. Inverter/converter 148 may be electrically connected to electrical storage unit 128 via line 146. Converted hydraulic energy from hydraulic system 36 and converted mechanical energy from powertrain 38 may be stored as electrical energy in electrical storage unit 128.

Motor-generator 120 may operate to generate AC (alternating current) electrical power. Motor-generator 120 may be a single unit, functioning as both a motor and a generator. The motor of motor-generator 120 may be powered by electrical unit 40, and may transfer that electrical power into mechanical power. The motor of motor-generator 120 may also be powered by mechanical energy transferred from powertrain 38, where the motor may mechanically power the generator of motor-generator 120. Motor-generator 120 may include a motor known in the art that is actuated by mechanical power to generate electrical power. Motor-generator 120 may be actuated by the mechanical power input of powertrain 38 via shaft 118. Motor-generator 120 may also include a generator commonly known in the art for converting a mechanical energy input to an electrical energy output. Motor-generator 120 may transfer electrical energy to electrical storage unit 128 via inverter/converter 123 and lines 125 and 126. Inverter/converter 123 may be an inverter/converter known in the art for converting AC electrical energy into DC (direct current) electrical energy. Electrical storage unit 128 may be a device commonly known in the art for storing electrical energy, such as, for example, a battery, a battery pack, or a capacitor. It is contemplated that electrical storage unit 128 may store DC electrical energy. It is also contemplated that electrical unit 40 may operate without an electrical storage unit 128 in an alternative embodiment.

It is contemplated that electrical storage unit 128 may power motor-generator 120 at selective times when, for example, power source 16 is under heavy, transient loads, e.g., during acceleration of machine 10. Electrical energy stored within electrical storage unit 128 may be discharged via inverter/converter 123 and lines 125 and 126 to electrically power motor-generator 120. Inverter/converter 123 may serve to convert DC electrical energy stored in electrical storage unit 128 into AC electrical energy for powering motor-generator 120. Motor-generator 120 may transfer additional mechanical power to powertrain 38 via shaft 118, thereby helping power source 16 in propelling machine 10.

Motors 52 and 54 of hydraulic system 36 may operate with generators 132 and 134, respectively, to generate AC electrical power. Motors 52 and 54 may actuate generators 132 and 134 via shafts 136 and 138, respectively. Generators 132 and 134 may be generators commonly known in the art for converting a mechanical energy input to an electrical energy output. Generators 132 and 134 may transfer AC electrical energy to inverter/converter 148 via lines 140 and 142, respectively, where inverter/converter 148 may be an inverter/converter known in the art for converting AC electrical energy into DC electrical energy. Inverter/converter 148 may transfer the converted DC electrical energy to electrical storage unit 128 via line 146. It is contemplated that electrical storage unit 128 may store electrical energy transferred from both hydraulic system 36 and powertrain 38.

Hybrid system 11 may include a control system having a controller, e.g., an electronic control unit (ECU). The control system may additionally include an operator interface and sensors for estimating the load on power source 16. The controller may be any type of programmable logic controller known in the art for automating machine processes. The controller may include input/output arrangements having electrical lines that allow the controller to be connected to the sensors, the operator interface, and to components of hybrid system 11. The controller may control the positioning of control valves 46, 48, 50 and 55 of hydraulic system 36. The controller may also control the electrical operation of generators 120, 132, and 134, inverter/converters 123 and 148, and electrical storage unit 128 of electrical unit 40. The controller may further receive input from sensors associated with power source 16, traction devices 112, and brakes 114 of powertrain 38.

INDUSTRIAL APPLICABILITY

The disclosed hybrid system may help a power source to drive a powertrain by simultaneously taking advantage of using the mechanical energy of a powertrain and the hydraulic energy of a hydraulic system to maximize energy regeneration in a machine. The system may store energy generated by a powertrain and a hydraulic system, using the stored energy to help drive a powertrain.

Hydraulic energy transferred from hydraulic system 36 may be used to generate power for helping to propel machine 10 across work surface 20. Control valves 46, 48, 50, and 55 may cooperate to direct pressurized fluid through hydraulic system 36. When control valves 50 and 55 are in the first position, pump 44 may pump fluid directly to tank 42 via passageway 56.

When control valve 50 is in the second position and control valve 46 is in the first position, pump 44 may pump fluid to control valve 46 via passageway 58 and control valve 46 may direct fluid to second chambers 80 of actuators 22, via passageway 63, to actuate actuators 22. As actuators 22 are actuated, fluid may flow from first chambers 78 to tank 42 via passageway 59. When control valve 50 is in the third position and control valve 46 is in the second position, pump 44 may pump fluid to first chambers 78 of actuators 22 via passageway 59. External loads may act on actuators 22 to force pressurized fluid out of second chambers 80 and toward motor 52 via passageways 63 and 64. Pressurized fluid may actuate motor 52 and then return to tank 42 via passageways 65 and 58.

When control valve 55 is in the second position and control valve 48 is in the first position, pump 44 may pump fluid to control valve 48 via passageway 61 and control valve 48 may direct fluid to second chamber 80 of actuator 25, via passageway 66, to actuate actuator 25. As actuator 25 is actuated, fluid may flow from first chamber 78 to tank 42 via passageway 62. When control valve 55 is in the third position and control valve 48 is in the second position, pump 44 may pump fluid to first chamber 78 of actuator 25 via passageway 62. External loads may act on actuator 25 to force pressurized fluid out of second chamber 80 and toward motor 54 via passageways 66 and 67. Pressurized fluid may actuate motor 54 and then return to tank 42 via passageways 68 and 61.

Motors 52 and 54 may actuate generators 132 and 134 via shafts 136 and 138, respectively, thereby generating AC electrical power. Generators 132 and 134 may transfer the electrical energy to inverter/converter 148 via lines 140 and 142, respectively, and inverter/converter 148 may convert the AC electrical energy into DC electrical energy, transferring the DC electrical energy to electrical storage unit 128 for storage via line 146. In addition to energy transferred from hydraulic system 36, powertrain 38 may simultaneously provide energy to electrical unit 40 for storage. At low speeds, kinetic energy may be transferred from traction devices 112 to first driveshaft 102 via axle 110, second driveshaft 106, and transmission 104. The kinetic energy may be transferred from first driveshaft 102 to shaft 118 via transfer gear 116. Shaft 118 may actuate motor-generator 120 to generate AC electrical power. Motor-generator 120 may transfer the AC electrical power to inverter/converter 123, via line 125, to be converted into DC electrical power, and inverter/converter 123 may transfer the DC electrical power to electrical storage unit 128 for storage via line 126.

Electrical storage unit 128 may thereby store energy transferred from both hydraulic system 36 and powertrain 38. During periods when power source 16 is braking and/or gravity loads are acting on actuators 22, electrical storage unit 128 may receive energy from powertrain 38 and hydraulic system 36 as described above. When power source 16 is under significant loading and additional power may be required to drive powertrain 38, electrical energy stored within electrical storage unit 128 may be selectively discharged via inverter/converter 123 and lines 125 and 126 to electrically power motor-generator 120. Motor-generator 120 may transfer additional mechanical power to first driveshaft 102 via shaft 118 and transfer gear 116.

It will be apparent to those skilled in the art that various modifications and variations can be made to the disclosed system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A hybrid system for a machine, comprising:
   a pump configured to generate fluid flow within a hydraulic system;
   a first actuator actuated by fluid pressurized by the pump;
   a first motor configured to be selectively actuated by pressurized fluid directed from the first actuator by an external load and directed to the first motor by a first control valve;
   a first generator configured to be actuated by the first motor;
   a power source configured to actuate the pump and a powertrain, the powertrain including a first driveshaft and at least one traction device, and the powertrain configured to transfer kinetic energy from the traction device to the first driveshaft during deceleration of the machine; and
a second generator configured to be selectively actuated by the kinetic energy transferred by the powertrain.

2. The hybrid system of claim 1, further including an electrical storage unit for storing electrical energy transferred from the first and second generators, the electrical storage unit configured to selectively power a second motor using electrical energy transferred from the first and second generators.

3. The hybrid system of claim 2, wherein the second generator and the second motor are a single unit.

4. The hybrid system of claim 1, wherein the external load is the weight of a tool of the machine.

5. The hybrid system of claim 1, further including an inverter/converter for converting electrical energy transferred from the first and second generators.

6. The hybrid system of claim 1, further including a second actuator configured to be actuated by the pump.

7. The hybrid system of claim 1, further including a transfer gear configured to transfer the kinetic energy from the powertrain to actuate the second generator.

8. The hybrid system of claim 7, further including a shaft operably connecting the transfer gear to the second generator.

9. The hybrid system of claim 8, wherein the shaft is configured to selectively transfer the kinetic energy to the second generator.

10. A hydraulic system for a hybrid machine, comprising:
a pump configured to generate fluid flow within a hydraulic system;
first, second, third, and fourth control valves, each having a plurality of positions for directing fluid;
a first actuator configured to be actuated by fluid pumped by the pump and directed to the first actuator via the first and second control valves;
a second actuator and a third actuator configured to be actuated by fluid pumped by the pump and directed to the second actuator and the third actuator via the third and fourth control valves;
a first motor configured to be selectively actuated by pressurized fluid directed from the first actuator by an external load and directed to the first motor via the second control valve;
a second motor configured to be selectively actuated by pressurized fluid directed from the second actuator and the third actuator by a load and directed to the second motor by the fourth control valve;
a first generator actuated by the first motor; and
a second generator actuated by the second motor.

11. The hydraulic system of claim 10, further including a check valve associated with the first control valve and configured to prevent flow from the first control valve to the pump.

12. The hydraulic system of claim 10, further including an electrical storage unit for storing electrical energy transferred from the first generator and the second generator.

13. The hydraulic system of claim 12, further including a powertrain driven by a power source, the powertrain being configured to selectively drive a third generator, the third generator being configured to direct electrical energy produced by the third generator to the electrical storage unit.

14. The hydraulic system of claim 10, wherein the first control valve and the third control valve are configured to operate in at least three different positions.

15. A machine, comprising:
at least one pump configured to generate fluid flow within a hydraulic system, the at least one pump actuated by a power source;
a plurality of control valves configured to direct the pressurized fluid within the hydraulic system;
a plurality of actuators actuated by the at least one pump;
a first motor actuated by pressurized fluid selectively directed from the plurality of actuators by an external load and directed to the first motor by the plurality of control valves;
a first generator actuated by the first motor;
a powertrain actuated by the power source, the powertrain having a plurality of driveshafts and a plurality of traction devices, the powertrain configured to transfer kinetic energy from the plurality of traction devices to the plurality of driveshafts during deceleration of the machine;
a transfer gear configured to transfer kinetic energy from the powertrain to actuate a second generator; and
an electrical storage unit for storing electrical energy transferred from the first generator and the second generator, the electrical storage unit configured to selectively power a second motor for selectively actuating the plurality of driveshafts.

16. The machine of claim 15, wherein the electrical storage unit selectively powers the second generator using electrical energy transferred from the first generator and the second generator.

17. The machine of claim 15, further including at least one inverter/converter for converting electrical energy transferred from the first generator.

18. The machine of claim 15, wherein the electrical storage unit is configured to selectively power the second generator with converted electrical energy, the second generator configured to actuate the plurality of driveshafts.

19. The machine of claim 15, wherein the plurality of driveshafts includes the transfer gear.

20. The machine of claim 19, further including a shaft operably connecting the transfer gear to the second generator, the shaft configured to actuate the second generator using the kinetic energy transferred by the powertrain.

* * * * *